United States Patent
Numata et al.

(10) Patent No.: US 10,222,528 B2
(45) Date of Patent: Mar. 5, 2019

(54) DISPLAY DEVICE

(71) Applicant: Japan Display Inc., Minato-ku (JP)

(72) Inventors: Yudai Numata, Tokyo (JP); Takeo Koito, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/440,751

(22) Filed: Feb. 23, 2017

(65) Prior Publication Data

US 2017/0242173 A1     Aug. 24, 2017

(30) Foreign Application Priority Data

Feb. 23, 2016   (JP) .................................. 2016-032243

(51) Int. Cl.
    *G02B 5/30*    (2006.01)
    *G02B 5/08*    (2006.01)
    *G02B 5/124*    (2006.01)

(52) U.S. Cl.
    CPC ............. *G02B 5/3083* (2013.01); *G02B 5/08* (2013.01); *G02B 5/124* (2013.01)

(58) Field of Classification Search
    CPC ........ G02B 5/3083; G02B 5/08; G02B 5/124; G02B 27/0018; G02F 2001/133638
    USPC ..................... 359/485.01, 489.07, 530, 614
    See application file for complete search history.

(56) References Cited

U.S. PATENT DOCUMENTS

| | | | |
|---|---|---|---|
| 3,709,580 A * | 1/1973 | Fugitt .................... | G02B 23/22 359/488.01 |
| 4,107,522 A * | 8/1978 | Walter .................... | G01V 8/18 250/221 |
| 5,061,050 A * | 10/1991 | Ogura .................. | G02B 5/3033 359/487.04 |
| 5,422,756 A * | 6/1995 | Weber .................... | G02B 5/124 359/485.03 |
| 5,559,634 A * | 9/1996 | Weber .................... | G02B 5/124 359/485.04 |
| 5,726,806 A * | 3/1998 | Holden .................. | G02B 27/01 359/630 |
| 5,764,411 A * | 6/1998 | Shanks .............. | G02B 27/2292 359/485.02 |

(Continued)

FOREIGN PATENT DOCUMENTS

JP    2011-253128    12/2011

OTHER PUBLICATIONS

Machine language translation of JP Publication No. 2011-253128 (published Dec. 15, 2011) from https://www4.j-platpat.inpit.go.jp/cgi-bin/tran_web_cgi_ejje?u=http://www4.j-platpat.inpit.go.jp/eng/translation/2018020105594692317343165614546919CEC0E14FEC22421C5A34C99E6D7FC18E. Downloaded Jan. 31, 2018.*

*Primary Examiner* — Frank G Font
(74) *Attorney, Agent, or Firm* — Oblon, McClelland, Maier & Neustadt, L.L.P.

(57) ABSTRACT

According to one embodiment, a display device includes an optical element urging incident light to be transmitted or reflected, a first reflective element includes a first retroreflective surface in an uneven state on which the light reflected on the optical element is retroreflected, and a first specular reflection surface on which the light reflected on the optical element is specularly reflected, and a second reflective element includes a second retroreflective surface in an uneven state on which the light reflected on the first specular reflection surface is retroreflected.

13 Claims, 15 Drawing Sheets

(56) References Cited

U.S. PATENT DOCUMENTS

| | | | | |
|---|---|---|---|---|
| 5,861,993 A | * | 1/1999 | Shanks | G02B 5/124 |
| | | | | 359/629 |
| 2015/0248014 A1 | * | 9/2015 | Powell | G02B 3/0006 |
| | | | | 349/10 |

* cited by examiner

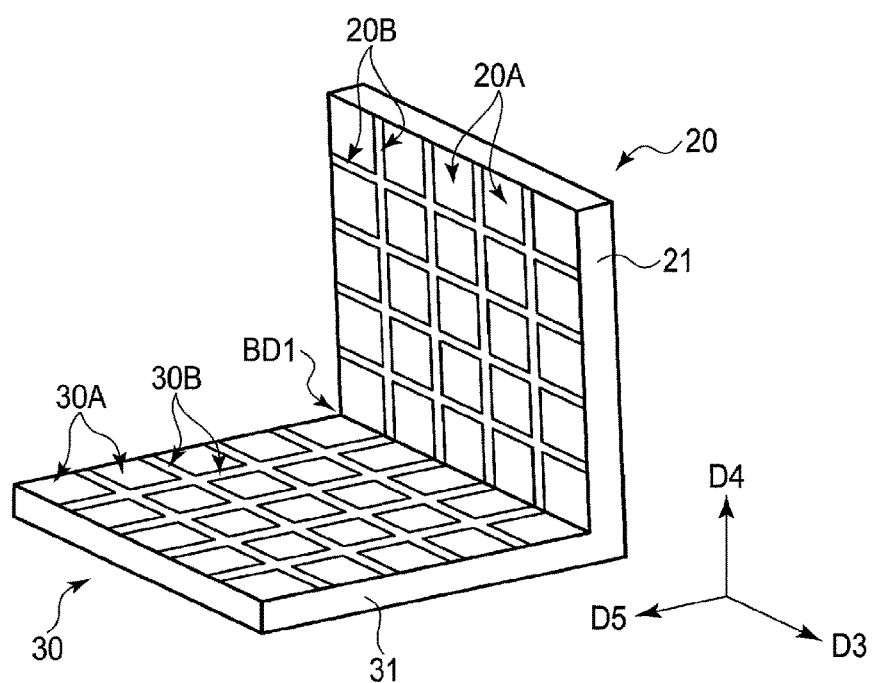
F I G. 3

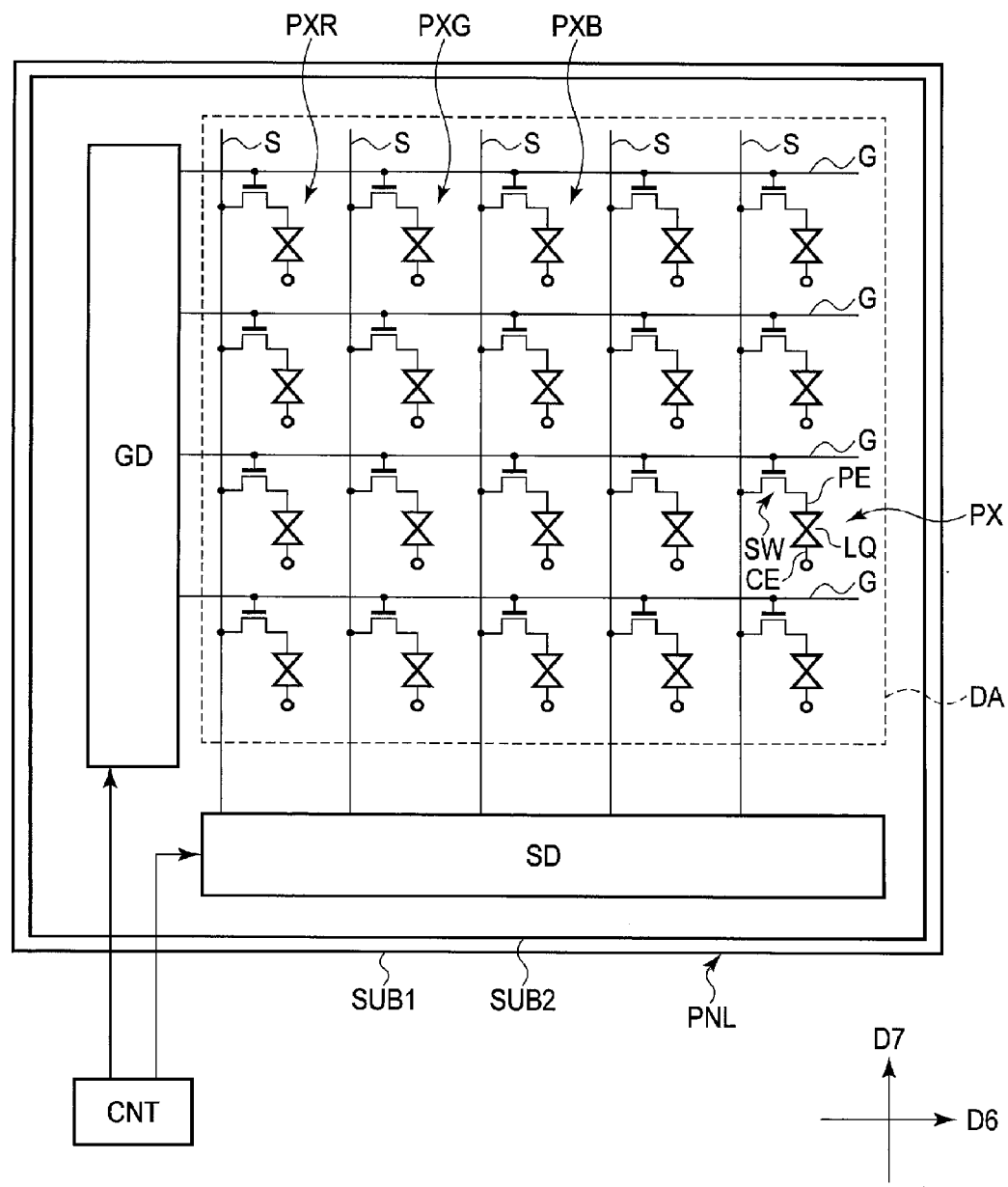
F I G. 4

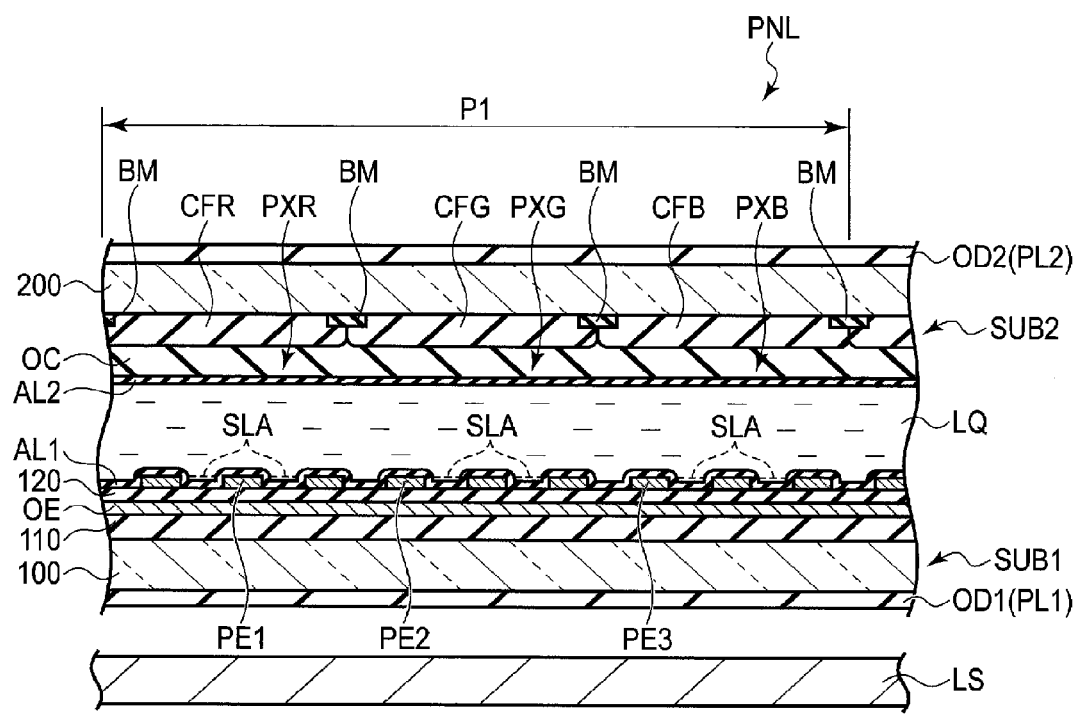
F I G. 5

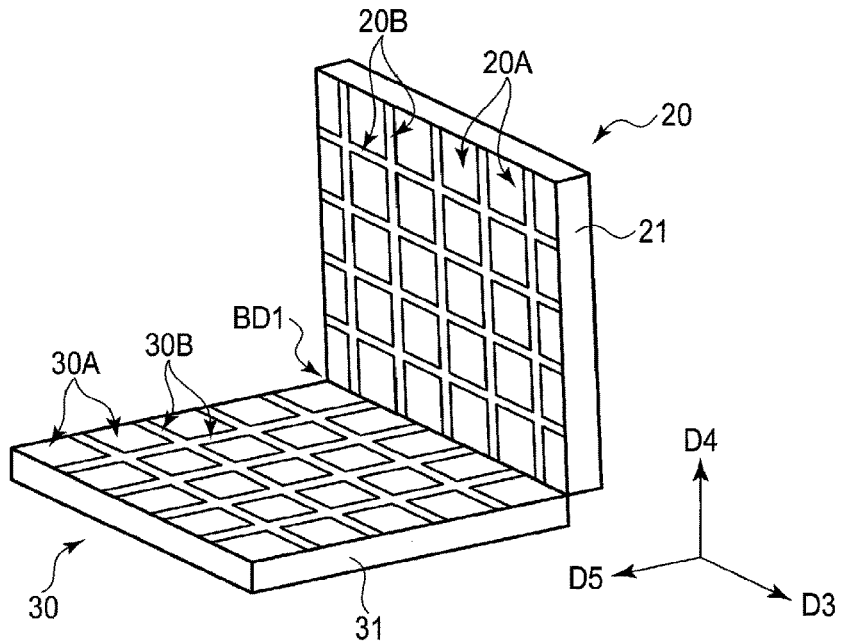
F I G. 11
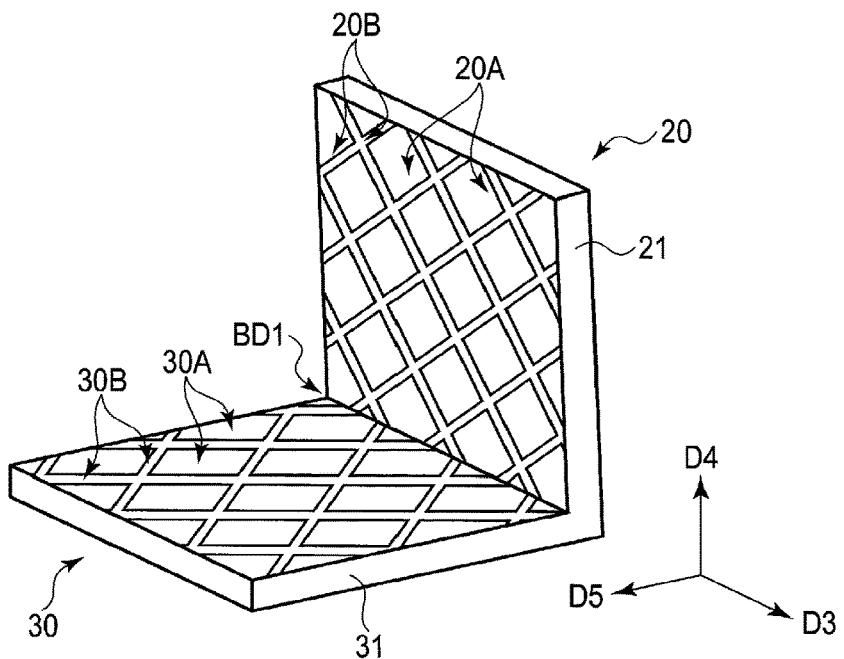
F I G. 12

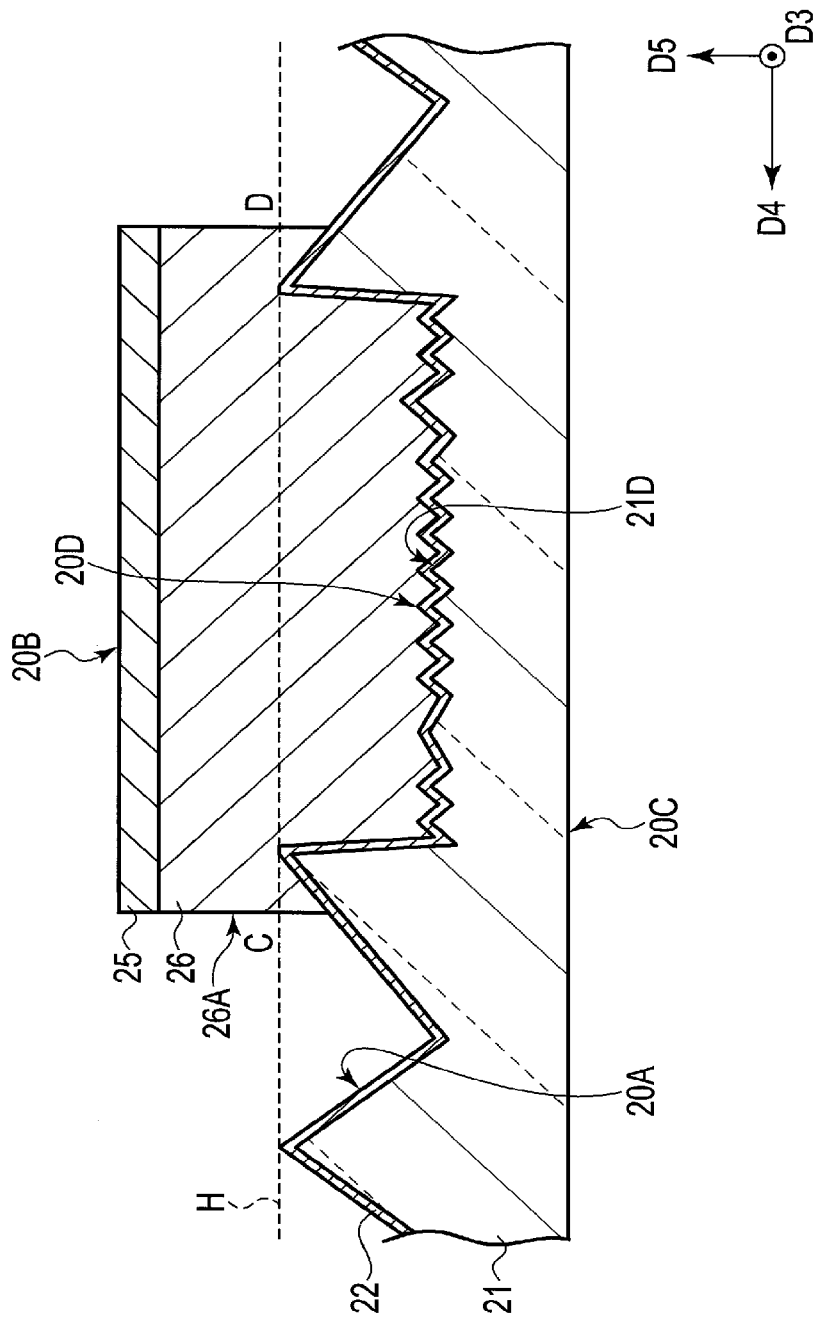
F I G. 14

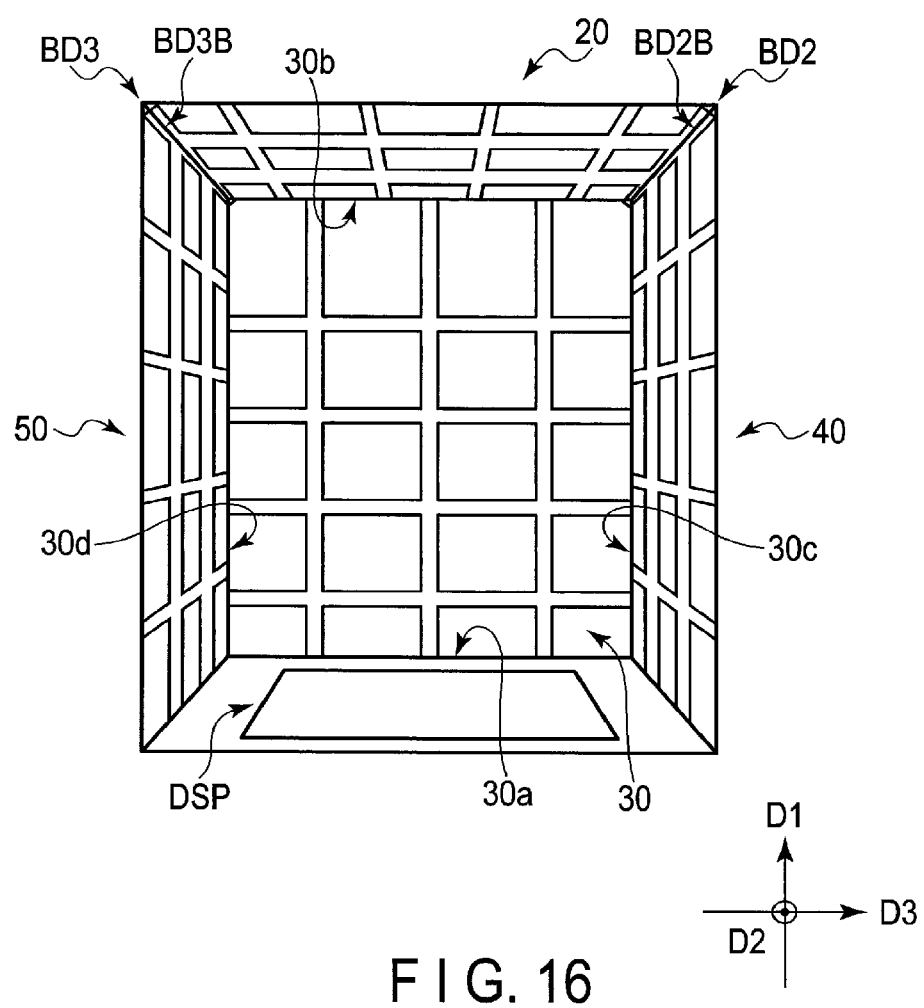
F I G. 16

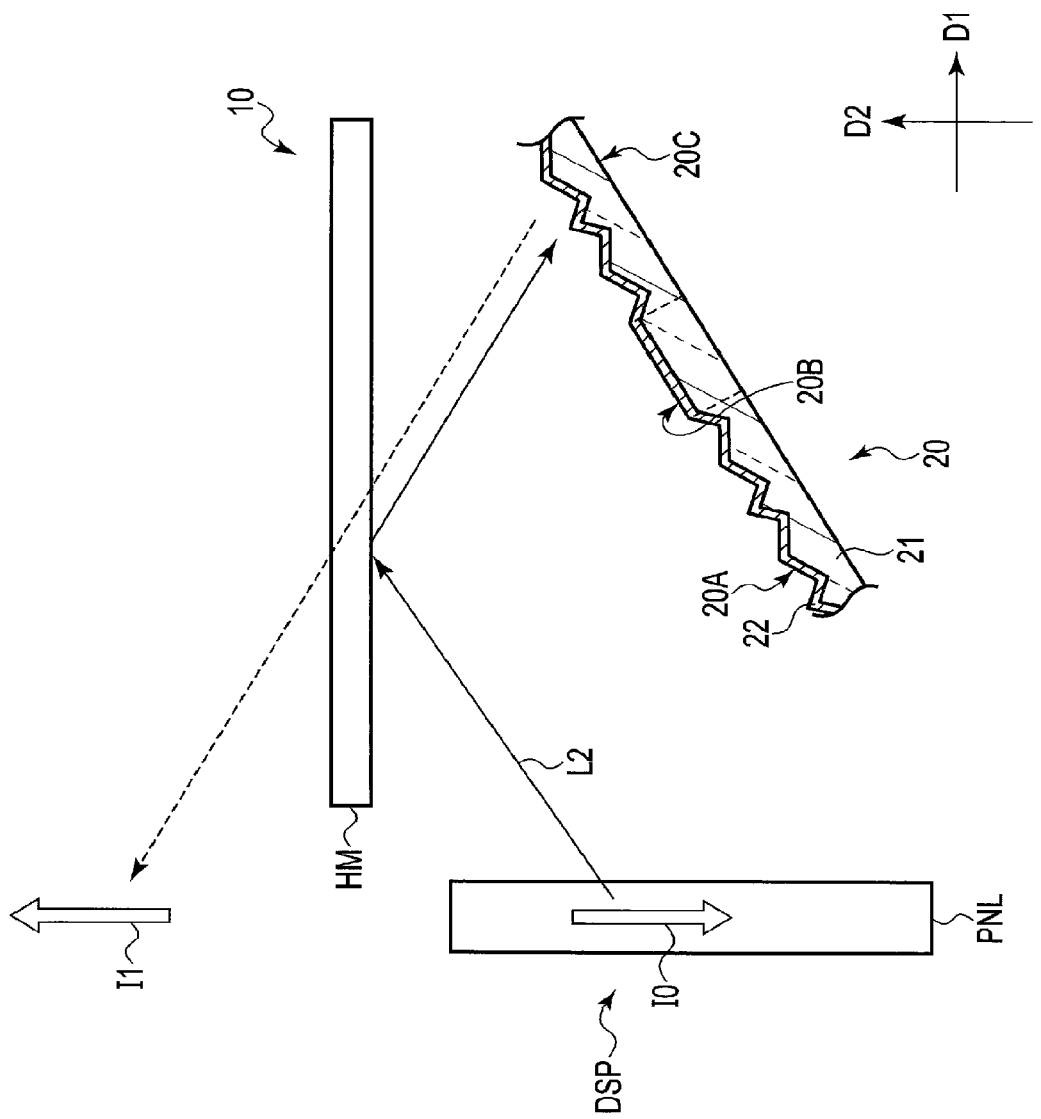
F I G. 18

DISPLAY DEVICE

CROSS-REFERENCE TO RELATED APPLICATIONS

This application is based upon and claims the benefit of priority from Japanese Patent Application No. 2016-032243, filed Feb. 23, 2016, the entire contents of which are incorporated herein by reference.

FIELD

Embodiments described herein relate generally to a display device.

BACKGROUND

An image forming device comprising, for example, a reflection-type polarizing filter and a retroreflective prism, and urging a display image to be reflected by the polarizing filter, reflected by the retroreflective prism, and transmitted through the polarizing filter to form the image has been proposed. Incidentally, if a retroreflector array corresponding to a reflective surface of a retroreflective prism has a discontinuous area, the light incident on the discontinuous area may not be retroreflected and, consequently, the display image may become discontinuous.

BRIEF DESCRIPTION OF THE DRAWINGS

FIG. 3 is an illustration showing a configuration example of reflective elements 20 and 30 shown in FIG. 1.

FIG. 4 is an illustration showing a configuration example of a display panel PNL shown in FIG. 1.

FIG. 5 is a cross-sectional view showing the configuration example of the display panel PNL shown in FIG. 4.

FIG. 11 is an illustration showing a modified example of the reflective elements 20 and 30 shown in FIG. 3.

FIG. 12 is an illustration showing a modified example of the reflective elements 20 and 30 shown in FIG. 3.

FIG. 14 is a cross-sectional view showing a modified example of the structure of the reflective element 20 shown in FIG. 9.

FIG. 16 is an illustration showing a modified example of the display device 1 shown in FIG. 1.

FIG. 18 is an illustration showing an optical path of display light L2 in the display device 1 shown in FIG. 17.

DETAILED DESCRIPTION

Figure 1:
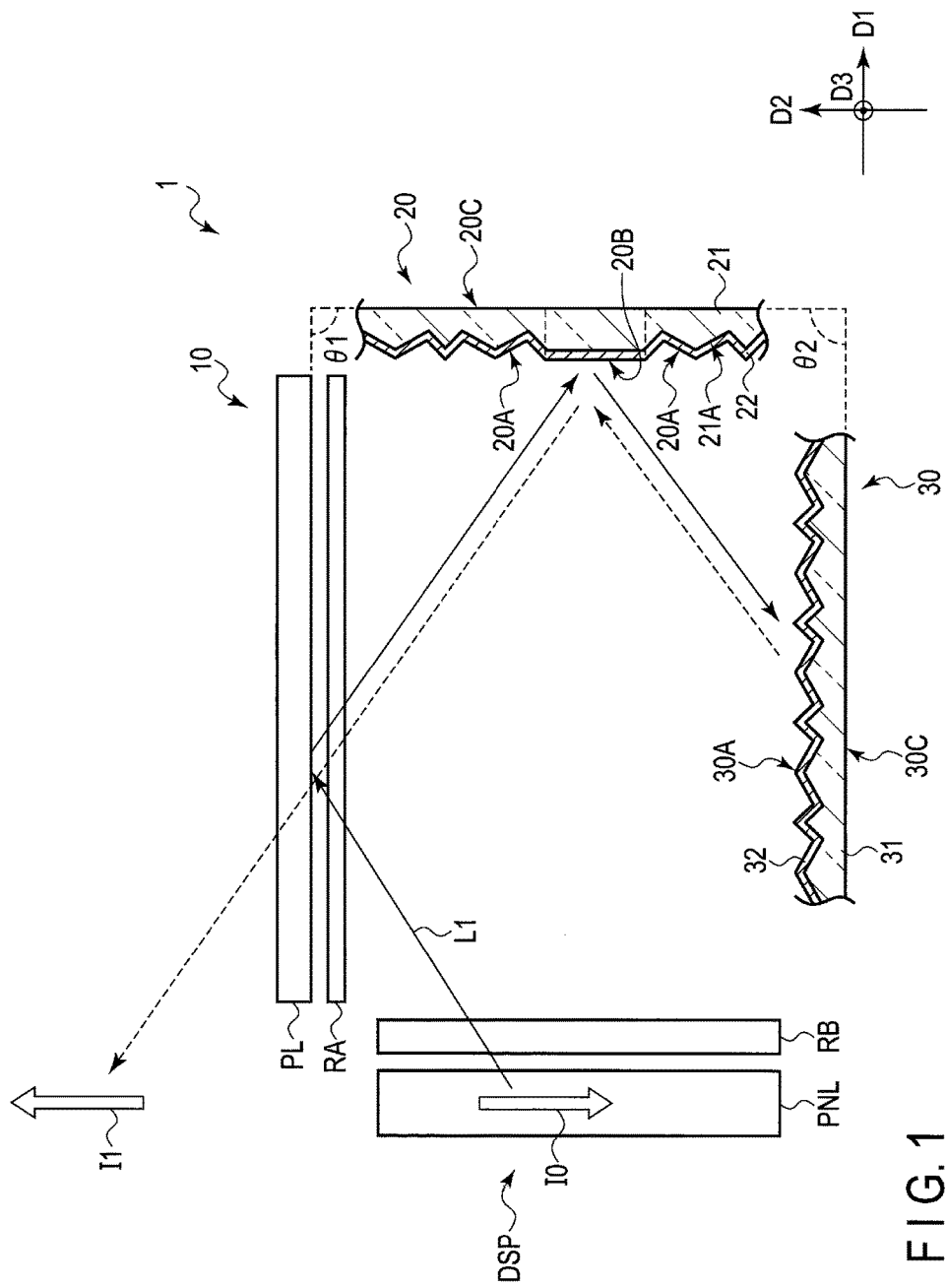
FIG. 1 is an illustration showing a configuration example of a display device 1 of a first embodiment and an optical path of display light L1.

In general, according to one embodiment, a display device comprises: an optical element urging incident light to be transmitted or reflected; a first reflective element comprising a first retroreflective surface in an uneven state on which the light reflected on the optical element is retroreflected, and a first specular reflection surface on which the light reflected on the optical element is specularly reflected; and a second reflective element comprising a second retroreflective surface in an uneven state on which the light reflected on the first specular reflection surface is retroreflected.

According to another embodiment, a display device comprises: an optical element urging part of incident light to be transmitted or reflected; and a reflective element comprising a retroreflective surface in an uneven state on which the light reflected on the optical element is retroreflected, and a specular reflection surface on which the light reflected on the optical element is specularly reflected, an angle formed by the reflective element with the optical element is an acute angle.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, structural elements equivalent or similar to those described in connection with preceding figures are denoted by the same reference numbers and their detailed descriptions may be omitted unless necessary, in the specification and drawings.

FIG. 1 is an illustration showing a configuration example of a display device 1 of a first embodiment and an optical path of display light L1.

The display device 1 comprises a display module DSP, an optical element 10, a reflective element 20, a reflective element 30 and the like. The display module DSP is opposed to the reflective element 20 in a first direction D1 and the optical element 10 is opposed to the reflective element 30 in a second direction D2. The second direction D2 is a direction intersecting the first direction D1, and is orthogonal to the first direction D1 in the example illustrated, but the first direction D1 may intersect the second direction D2 at an angle other than 90 degrees.

The configuration of the display module DSP is not particularly limited if the display module is capable of emitting the display light which is circularly polarized light. In the example illustrated, the display module DSP comprises a display panel PNL and a retardation film RB. The display panel PNL is, for example, a liquid crystal display panel which holds a liquid crystal layer between a pair of substrates. However, the display panel PNL may be a self-luminous display panel comprising an organic electroluminescent element (OLED) and the like, an electronic paper display panel comprising an electrophoretic element and the like, a display panel employing micro-electromechanical systems (MEMS), or a display panel employing electrochromism. The liquid crystal display panel may be a transmissive display panel which displays an image by allowing light from a light source device to be selectively transmitted, a reflective display panel which displays an image by allowing external light or the light from the light source device to be selectively transmitted, or a transflective display panel having display functions of both the transmissive display panel and the reflective display panel.

The display panel PNL emits the display light L1 representing a display image I0. The display light L1 becomes, for example, linearly polarized light immediately after being emitted from the display panel PNL. The retardation film RB is opposed to the display panel PNL in a substantially parallel state. The retardation film RB may be bonded to the emission surface side of the display panel PNL. The retardation film RB is, for example, a $\lambda/4$ plate which assigns a phase difference of approximately $\lambda/4$ to the transmitted light. $\lambda$ indicates a wavelength of the transmitted light (display light L1). The retardation film RB is disposed such that its slow axis intersects a polarization plane of the linearly polarized light of the display light L1 at an angle of 45 degrees though detailed explanations are omitted here. In the display module DSP, the display light L1 (linearly polarized light) emitted from the display panel PNL is transmitted through the retardation film RB and converted into circularly polarized light, which is emitted from the display module DSP. In the present embodiments, the circularly polarized light includes elliptically polarized light.

If the light emitted from the display panel PNL is the circularly polarized light, the retardation film RB is not disposed in the display module DSP. In addition, the display module DSP may include a screen to which light emitted from a projector is projected or a display medium (poster or the like) illuminated by a lighting unit, instead of the display panel.

If the optical element 10 is capable of urging the incident light to be transmitted or reflected, its configuration is not particularly limited. In the example illustrated, the optical element 10 comprises a polarizing element PL and a retardation film RA. The polarizing element PL comprises a transparent axis which allows first linearly polarized light to be transmitted and reflects second linearly polarized light orthogonal to the transparent axis. For example, the first linearly polarized light is a P wave parallel to the plane of incidence and the second linearly polarized light is an S wave perpendicular to the plane of incidence. The polarizing element PL is composed of, for example, a wire-grid polarizing filter, a reflective polarizing film using a brightness enhancement film, a multilayered body formed by overlaying the reflective polarizing film and an absorptive polarizer or the like. An absorptive polarizer is a polarizer which allows the linearly polarized light parallel to the transparent axis and absorbs linearly polarized light orthogonal to the transparent axis, and has higher degree of polarization than, for example, a reflective polarizer. If the polarizing element PL is composed of the multilayered body, the absorptive polarizer is disposed on the reflective polarizing film (i.e., on a side opposite to the side opposed to the retardation film RA) and has a transparent axis parallel to the transparent axis of the reflective polarizing film.

The retardation film RA is opposed to the polarizing element PL in a substantially parallel state. The retardation film RA may be bonded to the side of the polarizing element PL which is opposed to the display module DSP and the reflective element 20. The retardation film RA is, for example, a $\lambda/4$ plate which assigns a phase difference of approximately $\lambda/4$ to the transmitted light. $\lambda$ indicates a wavelength of the transmitted light. Each of the retardation films RA and RB may be a multilayer body of retardation films different in phase difference value and wavelength dispersion property. For example, each of the retardation films RA and RB may be configured by combining a $\lambda/2$ plate and a $\lambda/4$ plate for the purpose of reducing wavelength dependency and the like. The retardation film RA is disposed such that its slow axis intersects a polarization plane of the linearly polarized light at an angle of 45 degrees though detailed explanations are omitted here.

The reflective element 20 includes a retroreflective surface 20A and a specular reflection surface 20B on a side opposed to the retardation film RA and the display module DSP. The retroreflective surface 20A has an uneven surface and retroreflects the incident light. The specular reflection surface 20B has an even surface and the incident light is specularly reflected on the surface. In the example illustrated, the specular reflection surface 20B is located between the retroreflective surfaces 20A. The reflective element 20 comprises a base 21 and a metallic thin film 22. The base 21 is formed of, for example, a resin material. A surface 21A of the base 21 is uneven in regions corresponding to the retroreflective surfaces 20A while even in a region corresponding to the specular reflection surface 20B. In the example illustrated, a back surface 20C of the retroreflective element 20 (i.e., a back surface of the base 21 in the example illustrated) is an even surface. The metallic thin film 22 is formed of, for example, vapor deposition or the like and covers the surface 21A of the base 21. The metallic thin film 22 has a substantially uniform thickness. The metallic thin film 22 is formed of, for example, a material having an optical reflectivity such as silver (Ag), aluminum (Al) or an aluminum alloy.

The metallic thin film 22 forms the retroreflective surfaces 20A and the specular reflection surface 20B. In other words, in the example illustrated, the retroreflective element 20 has the uneven surfaces (retroreflective surfaces 20A) and the even surface (specular reflection surface 20B) on the inner side of the display device 1 on which various optical members such as the retardation films RA and RB are disposed, and also has an even surface (back surface 20C) on the outer side of the display device 1. The metallic thin film 22 may be subjected to surface treatment to prevent corrosion or coated with an inorganic material such as silicon nitride (SiN). In addition, if the base 21 is formed of a material having the optical reflectivity, the surface 21A of the base 21 may form the retroreflective surfaces 20A and the specular reflection surface 20B. The transmittance on the retroreflective surfaces 20A and the specular reflection surface 20B is substantially zero, and most of the light incident on the retroreflective surfaces 20A and the specular reflection surface 20B does not reach the back surface 20C of the retroreflective element 20.

The reflective element 30 has a retroreflective surface 30A on a side opposed to the optical element 10 and the reflective element 20. The retroreflective surface 30A has an uneven surface and retroreflects the incident light. In the example illustrated, the reflective element 30 comprises a base 31, and a metallic thin film 32 disposed on a side of the base 31 opposed to the reflective element 20. The retroreflective surface 30A is formed of a metallic thin film 32 covering the uneven surface of the base 31. In the example illustrated, the reflective element 30 has an uneven surface (retroreflective surface 30A) on the inner side of the display device 1, and an even surface (back surface 30C) on the outer side of the display device 1. The base 31 and the metallic thin film 32 of the reflective element 30 may be configured similarly to the base 21 and the metallic thin film 22 of the reflective element 20.

The reflective element 20 is disposed at an angle θ1 with respect to the optical element 10. The angle θ1 corresponds to, for example, an angle formed by the back surface 20C and the surface of the polarizing element PL. The reflective element 30 is disposed at an angle θ2 with respect to the optical element 20. The angle θ2 is, for example, an angle formed by the back surface 30C and the back surface 20C. The angle θ1 may be an angle at which the display light reflected on the optical element 10 is made incident on the retroreflective surfaces 20A or the specular reflection surface 20B and is not particularly limited. In addition, the angle θ2 may be an angle at which the display light reflected on the specular reflection surface 20B is made incident on the retroreflective surface 30A and is not particularly limited. For example, each of the angle θ1 and the angle θ2 is approximately 90 degrees. However, the angle θ1 is desirably set to be in a range between 45 degrees and 135 degrees from the viewpoint of efficiency of retroreflection on the retroreflective surfaces 20A, and the angle θ2 is desirably set to be in a range between 45 degrees and 135 degrees from the viewpoint of efficiency of retroreflection on the retroreflective surfaces 30A.

An optical path of the display light L1 will be explained as an example of behavior of the display light emitted from the display module DSP. A display image I1 corresponds to a real image of the display image I0 and is formed at a position of plane symmetry with the optical element 10. The display light L1 displaying the display image I0 is emitted from the display module DSP and is made incident on the optical element 10. The display light L1 is reflected on the optical element 10, then reflected on the specular reflection surface 20S and is made incident on the retroreflective surface 30A. The display light L1 is retroreflected on the retroreflective surface 30A, reflected again on the specular reflection surface 20B and is transmitted through the optical element 10 to form the display image I1.

Figure 2:
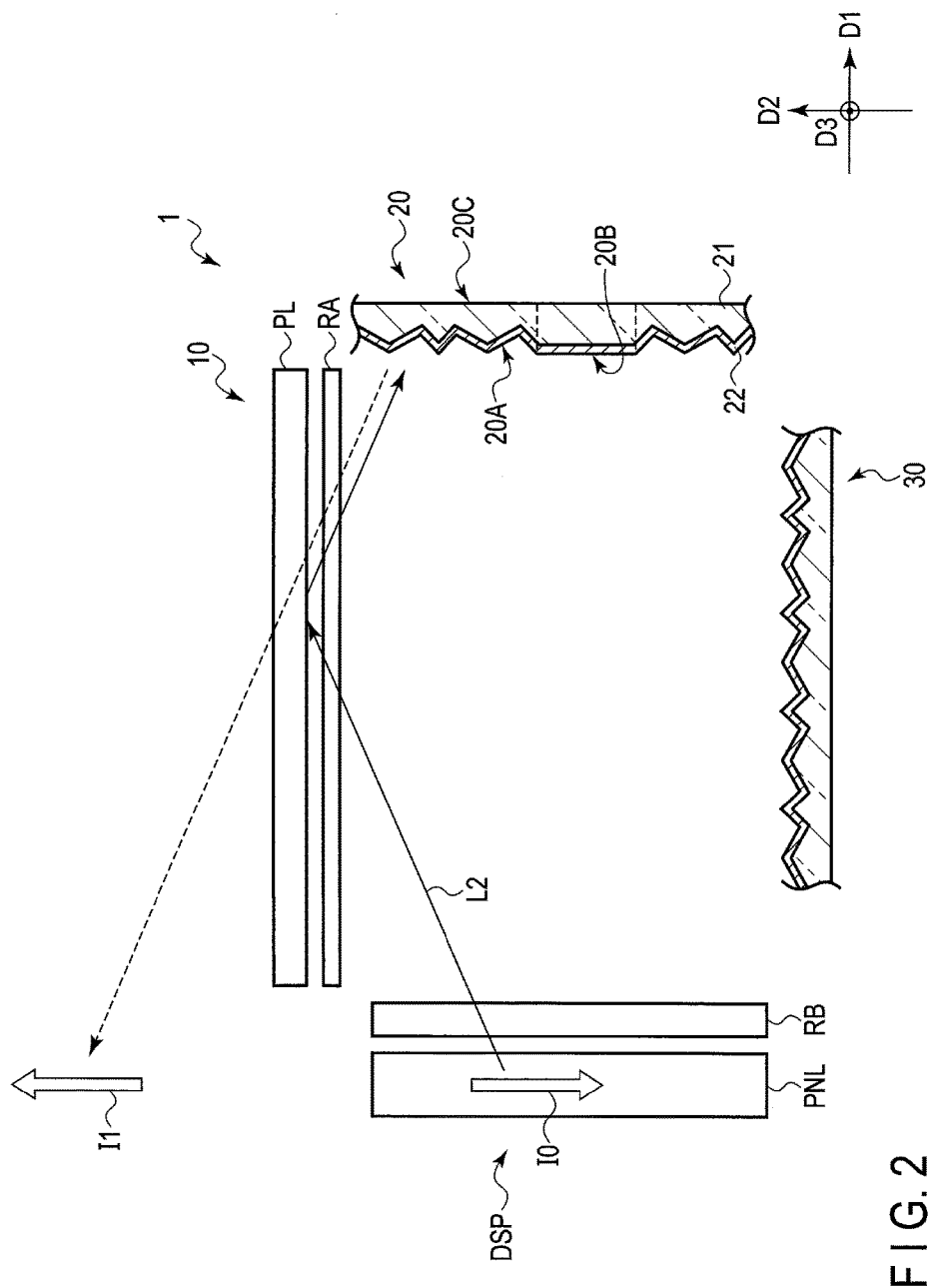
FIG. 2 is an illustration showing an optical path of display light L2 in the display device 1 shown in FIG. 1.

FIG. 2 is an illustration showing an optical path of display light L2 in the display device 1 shown in FIG. 1.

The behavior of the display light emitted from the display module DSP will be explained with reference to the display light L2 traveling in an optical path different from the optical path of the display light L1.

The display panel PNL emits the display light L2 representing the display image I0. The display light L2 is, for example, display light emitted from the same position as the display light L1 toward the different direction. Similarly to the display light L1, the display light L2 also becomes the linearly polarized light immediately after being emitted from the display panel PNL and is transmitted through the retardation film RB and converted into circularly polarized light. The display light L2 is emitted from the DSP, reflected on the optical element 10 and made incident on the retroreflective surface 20A. The display light L2 is retroreflected on the retroreflective surface 20A and transmitted through the optical element 10 to form the display image I1.

FIG. 3 is an illustration showing a configuration example of the reflective elements 20 and 30 shown in FIG. 1.

A fourth direction D4 is a direction intersecting a third direction D3 and a fifth direction D5 is a direction intersecting the third direction D3 and the fourth direction D4. In the example illustrated, the third direction D3 and the fifth direction D5 are orthogonal to each other.

The reflective element 20 is disposed parallel to a D3-D4 plane defined by the third direction D3 and the fourth direction D4. The reflective element 30 is disposed parallel to a D3-D5 plane defined by the third direction D3 and the fifth direction D5. The reflective element 30 has a retroreflective surface 30B on the same side as the retroreflective surface 30A.

In the example illustrated, the reflective element 20 has a plurality of specular reflection surfaces 20B and a plurality of retroreflective surfaces 20A. For example, the specular reflection surfaces 20B extend parallel in the third direction D3 and the fourth direction D4, intersect each other at right angles, and are disposed in a grating shape defining a rectangle or a square. The direction of extension of the specular reflection surfaces 20B is not particularly limited but the surfaces may extend in a direction of intersecting each other at an obtuse angle or an acute angle. At this time, the specular reflection surfaces 20B may be disposed in a grating shape defining a shape different from a rectangle (square), for example, a rhombus, a parallelogram or the like. The retroreflective surfaces 20A are surrounded by the specular reflection surfaces 20B and arrayed in a matrix in the third direction D3 and the fourth direction D4.

The reflective element 30 has a plurality of specular reflection surfaces 30B and a plurality of retroreflective surfaces 30A. The specular reflection surfaces 30B extend parallel in the third direction D3 and the fifth direction D5 and are disposed in a grating shape. The retroreflective surfaces 30A are surrounded by the specular reflection surfaces 30B and arrayed in a matrix in the third direction D3 and the fifth direction D5.

The reflective elements 20 and 30 are adjacent to each other at a boundary portion BD1 extending in the third direction D3. In the example illustrated, the retroreflective surfaces 20A and 30A are adjacent to each other and the specular reflection surfaces 20B and 30B are adjacent to each other, on the boundary portion BD1. The bases 21 and 31 of the respective reflective elements 20 and 30 are continuous and bent at the boundary portion BD1. In this configuration, the reflective elements 20 and 30 are not formed independently, but can be formed by folding an integrally formed reflective element at the boundary portion BD1. The reflective elements 20 and 30 may be formed by bending a reflective element at the boundary portion BD1. At this time, the retroreflective surfaces 20A and 30A are curved surfaces in close vicinity to the boundary portion BD1.

FIG. 4 is an illustration showing a configuration example of the display panel PNL shown in FIG. 1.

An active-matrix-driving transmissive liquid crystal display panel will be explained as an example of the display panel PNL. The display panel PNL includes a first substrate SUB1, a second substrate SUB2 opposed to the first substrate SUB1, and a liquid crystal layer LQ held between the first substrate SUB1 and the second substrate SUB2. The first substrate SUB1 and the second substrate SUB2 are bonded to each other with a predetermined cell gap formed between the substrates. The display panel PNL includes a display area DA where an image is displayed. The display area DA includes sub-pixels PX arrayed in a matrix.

The display area DA includes, for example, a red pixel PXR exhibiting a red color, a green pixel PXG exhibiting a green color, and a blue pixel PXB exhibiting a blue color, as the sub-pixels PX. The display area DA may further include a sub-pixel of a color different from red, green and blue (for example, a white pixel exhibiting a white color). Each pixel is composed of the sub-pixels PX of the different colors to implement the color display. The pixel is a minimum unit to form a color image. In the example illustrated, the pixel is composed of the red pixel PXR, the green pixel PXG, and the blue pixel PXB.

The red pixel PXR includes a red color filter and is formed to transmit red light mainly, of the white light from the light source device. The green pixel PXG includes a green color filter and is formed to transmit green light mainly, of the white light from the light source device. The blue pixel PXB includes a blue color filter and is formed to transmit blue light mainly, of the white light from the light source device. The color filters may be formed on the first substrate SUB1 or the second substrate SUB2 though not explained in detail.

The first substrate SUB1 includes gate lines G extending in a sixth direction D6 and source lines S extending in a seventh direction D7 and intersecting the gate lines G. Each of the gate lines G is led to the outside of the display area DA and is connected to a gate driver GD. Each of the source lines S is led to the outside of the display area DA and is connected to a source driver SD. The gate driver GD and the source driver SD are connected to the controller CNT. The controller CNT generates control signals, based on a video signal, to control the gate driver GD and the source driver SD.

Each of the sub-pixels PX includes a switching element SW, a pixel electrode PE, a common electrode CE and the like. The switching element SW is electrically connected to the gate line G and the source line S. The switching element SW is composed of, for example, a thin-film transistor. The pixel electrode PE is electrically connected to the switching element SW. The common electrode CE is opposed to the pixel electrode PE.

Detailed explanations of the configuration of the display panel PNL are omitted here but, the pixel electrode PE is disposed on the first substrate SUB1 while the common electrode CE is disposed on the second substrate SUB2, in a display mode using a longitudinal electric field extending along the normal line of the main surface of the substrate or a display mode using an inclined electric field which is angled obliquely with respect to the main surface of the substrate. In addition, both the pixel electrode PE and the common electrode CE are disposed on the first substrate SUB1, in a display mode using a lateral electric field extending along the main surface of the substrate. Furthermore, the display panel PNL may be configured to correspond to a display mode composed of an arbitrary combination of the above-explained longitudinal, lateral, and inclined electric fields. The main surface of the substrate corresponds to a plane defined by the sixth direction D6 and the seventh direction D7.

FIG. 5 is a cross-sectional view showing the configuration example of the display panel PNL shown in FIG. 4.

A cross-sectional structure of the display panel PNL using a fringe field switching (FFS) mode which is one of the display modes using the lateral electric field will be explained in brief.

The first substrate SUB1 includes a first insulating substrate 100, a first insulating film 110, the common electrode CE, a second insulating film 120, pixel electrodes PE1 to PE3, a first alignment film AL1 and the like. The common electrode CE extends across the red pixel PXR, the green pixel PXG and the blue pixel PXB. Each of the pixel electrode PE1 of the red pixel PXR, the pixel electrode PE2 of the green pixel PXG, and the pixel electrode PE3 of the blue pixel PXB is opposed to the common electrode CE and includes a slit SLA. In the example illustrated, the common electrode CE is located between the first insulating film 110 and the second insulating film 120, and the pixel electrodes PE1 to PE3 are located between the second insulating film 120 and the first alignment film AL1. The pixel electrodes PE1 to PE3 may be located between the first insulating film 110 and the second insulating film 120, and the common electrode CE may be located between the second insulating film 120 and the first alignment film AL1. In this case, the slits SLA may be formed on the common electrode CE.

The second substrate SUB2 includes a second insulating substrate 200, a light-shielding layer BM, color filters CFR, CFG and CFB, an overcoat layer OC, a second alignment film AL2, and the like. The color filters CFR, CFG and CFB are opposed to the pixel electrodes PE1 to PE3, respectively, through the liquid crystal layer LQ. The color filter CFR is a red color filter, the color filter CFG is a green color filter, and the color filter CFB is a blue color filter. In the example illustrated, the color filters CFR, CFG and CFB are formed on the second substrate SUB2, but may be formed on the first substrate SUB1.

The liquid crystal layer LQ is sealed between the first alignment film AL1 and the second alignment film AL2. The light source device LS is opposed to the first substrate SUB1. Various types of devices are applicable as the light source device LS, but detailed explanations of the structure are omitted here.

A first optical element OD1 including a first polarizer PL1 is disposed on an outer surface of the first insulating substrate 100. A second optical element OD2 including a second polarizer PL2 is disposed on an outer surface of the second insulating substrate 200. For example, a first absorption axis of the first polarizer PL1 and a second absorption axis of the second polarizer PL2 are orthogonal to each other.

The pixels composed of the red pixels PXR, the green pixels PXG, and the blue pixels PXB are aligned with a pitch P1.

Figure 6:
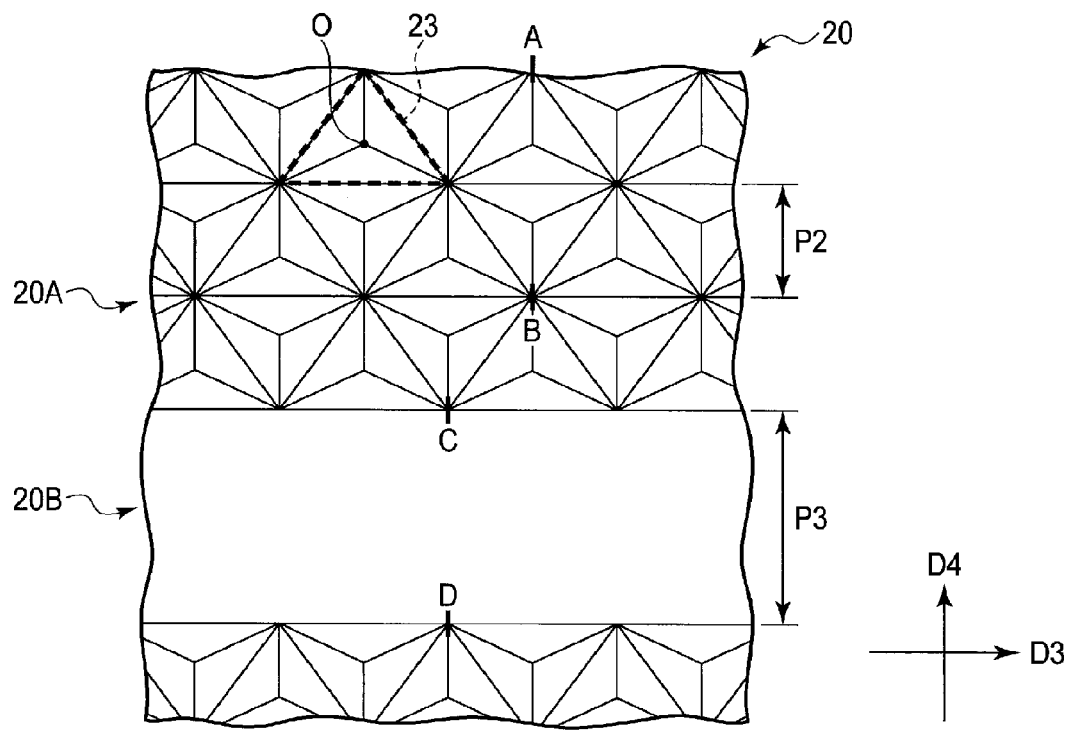
FIG. 6 is a plan view showing a configuration example of the reflective element 20 shown in FIG. 1.

FIG. 6 is a plan view showing a configuration example of the reflective element 20 shown in FIG. 1.

A plane defined by the third direction D3 and the fourth direction D4 which intersect each other is illustrated in the plan view.

The reflective element 20 comprises retroreflectors 23. Each of the retroreflectors 23 is shaped in a regular triangle in the plan view. In the retroreflector 23, its center O is recessed toward the back of the paper to form the retroreflective surface 20A shown in FIG. 1. The retroreflectors 23 are aligned in the third direction D3. In addition, the retroreflectors 23 are aligned in the fourth direction D4 with a pitch P2. However, the retroreflectors 23 adjacent to each other in the third direction D3 and the fourth direction D4 are shaped to be alternately inversed by 180 degrees.

The specular reflection surface 20B is adjacent to the retroreflectors 23. The retroreflectors 23 are formed by molding, for example, the resin base 21. If a large resin is process, the retroreflectors 23 can be molded together by aligning a plurality of molds but the retroreflectors 23 can hardly be formed at the boundaries of the molds and the like. The specular reflection surface 20B can be formed in an area where the retroreflectors 23 are not formed. In the example illustrated, the specular reflection surfaces 20B are formed in the fourth direction D4 with a pitch P3 and extend in the fifth direction D5. The pitch P3 is, for example, approximately two to three times as large as the pitch P2.

The resolution of the display image I1 depends on the pitch P2 of the retroreflectors 23. To suppress deterioration in resolution, the pitch P2 is desirably smaller than the pitch P1 of the pixels on the display panel PNL shown in FIG. 3.

Figure 7:
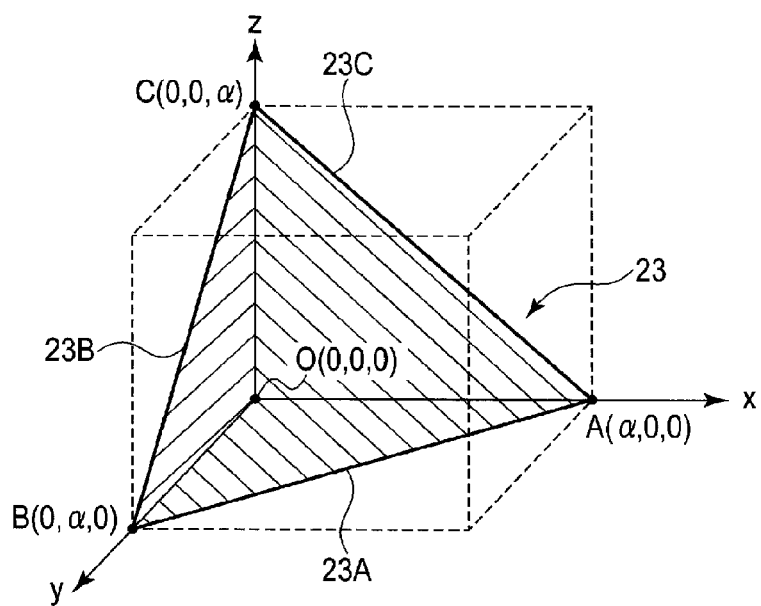
FIG. 7 is a perspective view showing a configuration example of a retroreflector 23 shown in FIG. 6.

FIG. 7 is a perspective view showing a configuration example of the retroreflector 23 shown in FIG. 6.

The shape of the retroreflector 23 will be explained by using xyz-coordinate systems intersecting each other.

The retroreflector 23 includes three reflective surfaces 23A, 23B, and 23C in the xyz-coordinate systems. The reflective surfaces 23A to 23C have the same shape, which is a right-angled isosceles triangle. The reflective surfaces 23A to 23C intersect each other. The retroreflector 23 including the reflective surfaces 23A to 23C having such a shape is called a corner cube or a corner reflector.

When point A ($\alpha$, 0, 0) is located on the x-axis, point B (0, $\alpha$, 0) is located on the y-axis and point C (0, 0, $\alpha$) is located on the z-axis, the reflective surface 23A is formed in the x-y plane and defined by origin O, point A, and point B. The reflective surface 23B is formed in the y-z plane and defined by origin O, point B, and point C. The reflective surface 23C is formed in the x-z plane and defined by origin O, point A, and point C. The retroreflector 23 does not include a plane defined by three points A, B, and C. In other words, the internal side surrounded by three reflective surfaces 23A to 23C is an air layer. In the retroreflector 23, retroreflection in which the incident light is reflected in substantially the same optical paths as those of the incident light by being reflected on three reflective surfaces 23A to 23C is implemented.

The shape of the retroreflector 23 is not limited to the example illustrated. For example, since the retroreflection rate is lower in close vicinity to three points A, B, and C, the vicinities of points A, B, and C may be cut.

Figure 8:
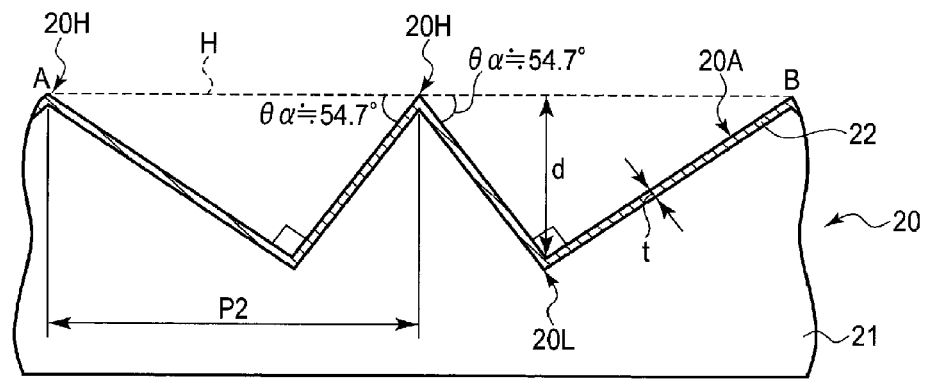
FIG. 8 is a cross-sectional view showing a structure of the reflective element 20 as cut in line A-B shown in FIG. 6.

FIG. 8 is a cross-sectional view showing the structure of the reflective element 20 as cut in line A-B shown in FIG. 6.

As illustrated in the figure, the retroreflective surface 20A formed on the surface of the metallic thin film 22 is recessed from a horizontal plane (i.e., a plane parallel to the plane defined by the third direction D3 and the fourth direction D4) H represented by a broken line. The retroreflective surface 20A has a bottom part 20L corresponding to center O illustrated in FIG. 6, and a top part 20H located on the horizontal plane H. A cross-section formed by the horizontal plane H and the retroreflective surface 20A represents a right-angled triangle linking the bottom part 20L to the top part 20H and having a right angle at the bottom part 20L, and the horizontal plane H corresponds to a hypotenuse. An angle $\theta\alpha$ of two acute angles formed other than the right angle is approximately 54.7 degrees.

For example, if the pitch P1 of the pixels on the display panel PNL is 200 µm, the pitch P2 of the retroreflectors on the retroreflective element 20 is 180 µm, and the pitch P2 is smaller than the pitch P1. In addition, the retroreflective surface 20A has depth d along the fifth direction D5 corresponding to the normal direction of the horizontal plane H. For example, the depth d is, for example, 73.5 µm. The thickness t of the metallic thin film 22 is 150 nm, which is much smaller than the depth d. For this reason, the surface of the base 21 shaped in the retroreflective surface 20A cannot be filled with the metallic thin film 22 or cannot collapse the retroreflective surface 20A when the metallic thin film 22 is formed.

Figure 9:
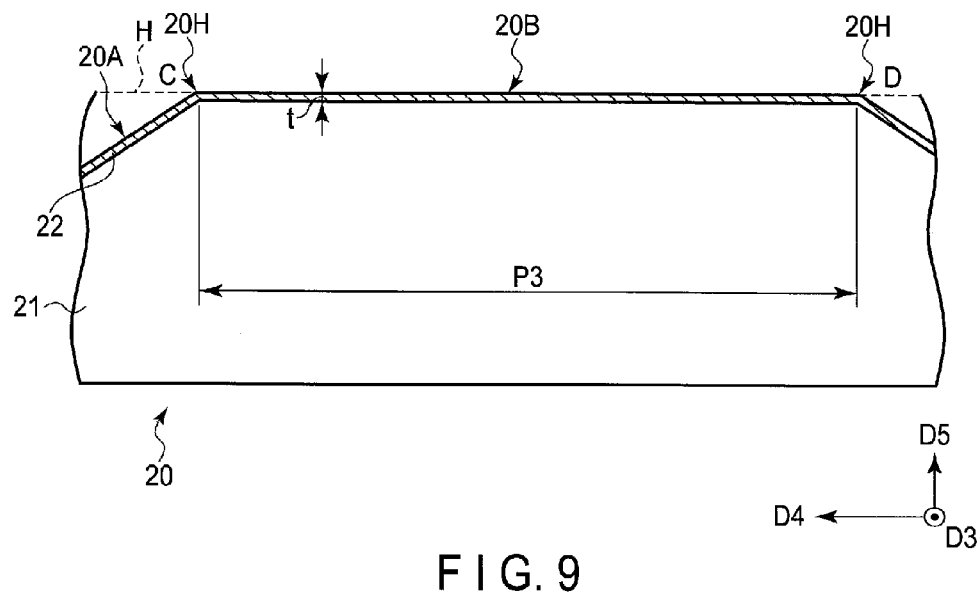
FIG. 9 is a cross-sectional view showing the structure of the reflective element 20 as cut in line C-D shown in FIG. 6.

FIG. 9 is a cross-sectional view showing the structure of the reflective element 20 as cut in line C-D shown in FIG. 6.

The specular reflection surface 20B is formed parallel to the retroreflectors 23. In the example illustrated, the specular reflection surface 20B is formed on the plane connecting the top parts 20H of the retroreflective surface 20A and is located on the horizontal plane H. The surface of the base 21 in a region corresponding to the specular reflection surface 20B is flattened by, for example, polishing and the metallic thin film 22 of a uniform thickness is disposed. In addition, the thickness t of the metallic thin film 22 on the specular reflection surface 20B may be equal to that on the retroreflective surfaces 20A. In this configuration, the metallic thin film 22 can be forms the retroreflective surfaces 20A and the specular reflection surface 20B.

For example, if the pitch P2 of the retroreflectors 23 is 100 to 150 µm, the pitch P3 of the specular reflection surface 20B is 200 to 400 µm and is larger than the pitch P2. The pitch P3 may be smaller than the pitch P1 or may be larger than or equal to the pitch P1. The structure of the reflective element 20 has been explained with reference to FIG. 6 to FIG. 9 but the reflective element 30 has substantially the same structure as the reflective element 20. For this reason, detailed descriptions of the structure of the reflective element 30 are omitted.

Figure 10:
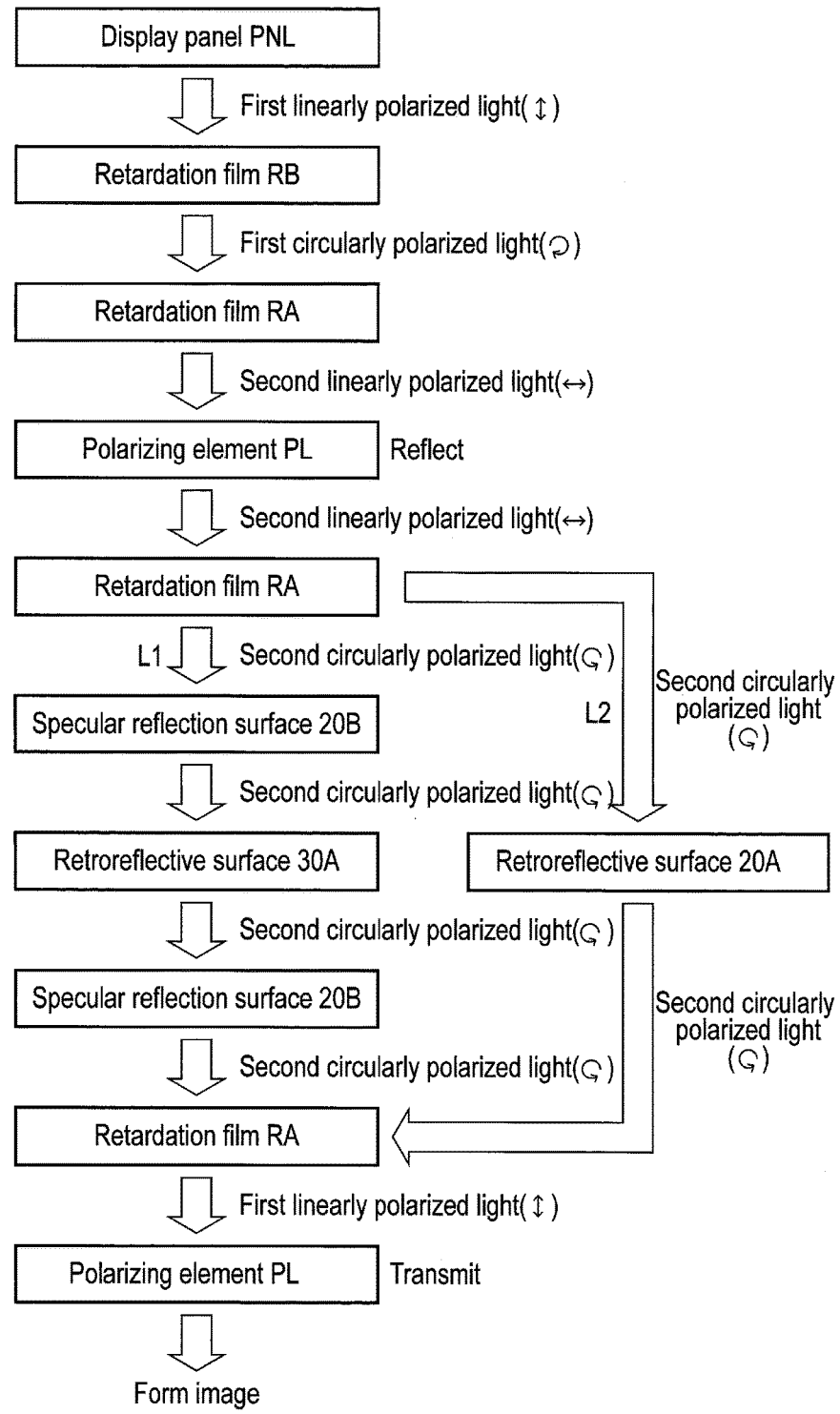
FIG. 10 is a flowchart for explanation of functions of respective constituent elements in the display device 1.

FIG. 10 is a flowchart for explanation of functions of the constituent elements in the display device 1.

First, in the display module DSP, the display panel PNL emits first linearly polarized light corresponding to the display light L1 and L2 of the display image I0. The first linearly polarized light has a polarization plane parallel to the transparent axis of the polarizing element PL and corresponds to the linearly polarized light which is transmitted through the polarizing element PL. The first linearly polarized light is transmitted through the retardation film RB and converted into first circularly polarized light. The first circularly polarized light draws a locus which rotates clockwise as seen from a direction opposite to the direction of travel of the light. The display module DSP thereby emits the display light which is the first circularly polarized light.

Next, the display light L1 and L2 which is the first circularly polarized light is transmitted through the retardation film RA and is converted into second linearly polarized light. The second linearly polarized light has a polarization plane perpendicular to the transparent axis of the polarizing element PL. The second linearly polarized light is reflected by the polarizing element PL, transmitted through the retardation film RA again and converted into second circularly polarized light. The second circularly polarized light draws a locus which rotates counterclockwise as seen from the direction opposite to the direction of travel of the light and is circularly polarized light in a direction opposite to the first circularly polarized light.

Then, the display light L1 of the second circularly polarized light is reflected by the specular reflection surface 20B of the reflective element 20. The second circularly polarized light reflected on the specular reflection surface 20B is retroreflected on the retroreflective surface 30A of the reflective element 30. The second circularly polarized light is reflected again on the specular reflection surface 20B. The second circularly polarized light is transmitted through the retardation film RA and is converted into the first linearly polarized light. After this, the display light L1 which is the first linearly polarized light is transmitted through the polarizing element PL to form an image as the display image I1.

In contrast, the display light L2 emitted from the display module DSP is reflected on the polarizing element PL, converted into the second circularly polarized light by the retardation film RA, and retroreflected on the retroreflective surface 20A of the reflective element 20. The second circularly polarized light is transmitted through the retardation film RA and is converted into the first linearly polarized light. After this, the display light L1 which is the first linearly polarized light is transmitted through the polarizing element PL to form an image as the display image I1. The observer can observe the display image I1 formed in air by the display light L1 and L2.

According to the first embodiment, the display device 1 comprises the reflective element 20 having the retroreflective surfaces 20A and the specular reflection surfaces 20B, and the reflective element 30 having the retroreflective surfaces 30A. For this reason, even the display light L1 incident on a region which is sandwiched by the retroreflective surfaces 20A of the reflective element 20 and which has no retroreflection property can contribute to formation of the display image I1 by being reflected on the specular reflection surfaces 20B and retroreflected on the retroreflective surfaces 30A. Even if the display device 1 comprises the reflective element 20 on which the retroreflective surfaces 20A are discontinuously formed, the display device 1 can reduce discontinuity of the display image I1 and suppress deterioration in display quality. For example, even if an uneven surface is not formed in a region corresponding to the boundary of the molds when an uneven surface of the base 21 is formed by the molds or even if an uneven surface is not formed at a seam when the reflective element 20 is formed by connecting a plurality of sheets, deterioration in display quality of the display image I1 can be suppressed by forming the specular reflection surfaces in the regions. In addition, the reflective element 20 can be formed and the manufacturing costs can be suppressed by aligning and molding a plurality of inexpensive and small modes and sequentially pressing the molds as compared with preparation of a large mold.

If the specular reflection surface 20B is formed on the plane connecting the top parts 20H, the structure of the retroreflector 23 is not collapsed on the boundary between the retroreflective surfaces 20A and the specular reflection surface 20B and the deterioration retroreflection property can be suppressed.

For example, the retroreflective surfaces 20A and the specular reflection surfaces 30B are adjacent to each other on the boundary portion BD1 between the reflective elements 20 and 30. If the display light is specularly reflected on the boundary BD1, the display light cannot contribute to the formation of the display image I1 and, according to this configuration, the display light made incident on the boundary BD1 can contribute to the formation of the display image I1.

In addition, for example, the specular reflection surfaces 20B and 30B extend orthogonally or parallel to the boundary portion BD1 and are adjacent to each other on the boundary portion BD1. The rate of the specular reflection on the boundary portion BD1 can be therefore reduced as compared with a case where the specular reflection surfaces 20B and the retroreflective surfaces 30A are adjacent to each other and the retroreflective surfaces 20A and the specular reflection surfaces 30B are adjacent to each other.

If the reflective elements 20 and 30 comprise the continuous base, the reflective elements 20 and 30 can be formed by bending the single reflective element. The display device 1 can simplify the manufacturing process and reduce the manufacturing costs as compared with a case where the reflective elements 20 and 30 are formed and disposed separately.

For example, the optical element 10 comprises the reflective polarizing element PL and the retardation film RA. For example, the display device 1 can efficiently reflect the light emitted from the display module DSP toward the reflective element 20 as compared with a case where the optical element 10 is a half-mirror. The display device 1 can therefore improve the efficiency of use of the display light to form the display image I1 and can form the clear display image I1. In addition, brightness of the display module DSP can be suppressed and the power consumption can be suppressed.

The external light traveling toward the reflective elements 20 and 30 via the polarizing element PL is converted into the first linearly polarized light, and then transmitted through the retardation film RA, which is the $\lambda/4$ plate before and after reflected on the reflective elements 20 and 30. For this reason, the external light reflected on the reflective elements 20 and 30 and returning to the polarizing element PL has been therefore converted into the second linearly polarized light and cannot be transmitted through the polarizing element PL. In other words, the occurrence of ghost caused by the external light can be suppressed.

According to the present embodiments, the other reflective surface (i.e., an even surface of an optical member, an interface between optical members or the like) does not exist between the retardation film RA and the retroreflective surfaces 20A (or the specular reflection surfaces 20B). If the retroreflective surfaces 20A and the specular reflection surfaces 20B are formed of metallic thin films, transmission of the light through the retroreflective surfaces 20A and the specular reflection surfaces 20B can be suppressed. In other words, reflection can be suppressed on the back surface 20C on the side opposite to the retroreflective surfaces 20A and the specular reflection surfaces 20B, at reflective element 20. In addition, the other reflective surface does not exist between the specular reflection surfaces 20B and the retroreflective surfaces 30A, either, in the configuration example. If the retroreflective surfaces 30A are formed of metallic thin films, reflection on the back surface 30C of the retroreflective surfaces 30A can be suppressed. The occurrence of ghost can be therefore suppressed and the deterioration in display quality of the display image I1 observed by forming the image of the retroreflected display light can be suppressed.

Next, a modified example of the first embodiment will be explained. The same constituent elements as those of the above-explained configuration example are denoted by like reference numerals and their detailed explanations are omitted. In this modified example, too, the same advantages as the above-explained advantages can be obtained.

FIG. 11 is an illustration showing a modified example of the reflective elements 20 and 30 shown in FIG. 3.

The present modified example is different from the configuration example shown in FIG. 3 with respect to a feature that the specular reflection surfaces 20B are adjacent to the retroreflective surfaces 30A and the specular reflection surfaces 30B are adjacent to the retroreflective surfaces 20A, on the boundary portion BD1. The specular reflection surfaces 20B and 30B are disposed discontinuously to each other on the boundary portion BD1 and displaced in the third direction D3.

According to the present modified example, if the plane of incidence of the display light is a D4-D5 plane defined by the fourth direction D4 and the fifth direction D5, incidence of the display light reflected on the specular reflection surfaces 20B on the specular reflection surfaces 30B can be suppressed as compared with the configuration in which the specular reflection surfaces 20B and 30B are disposed continuously. Since the light incident on the specular reflection surfaces 30B hardly contributes to the formation of the display image I1, the display device 1 can improve the efficiency of use of the display light L2.

FIG. 12 is an illustration showing a modified example of the reflective elements 20 and 30 shown in FIG. 3.

The present modified example is different from the configuration example shown in FIG. 3 with respect to a feature that the specular reflection surfaces 20B and 30B extend in a direction inclined to the boundary portion BD1. In other words, the specular reflection surfaces 20B and 30B are not formed continuously on the D4-D5 plane.

According to the present modified example, the reflective elements 20 and 30 can be simply formed of a single reflective element and the D4-D5 plane can improve the efficiency of use of the display light which is the plane of incidence.

Figure 13:
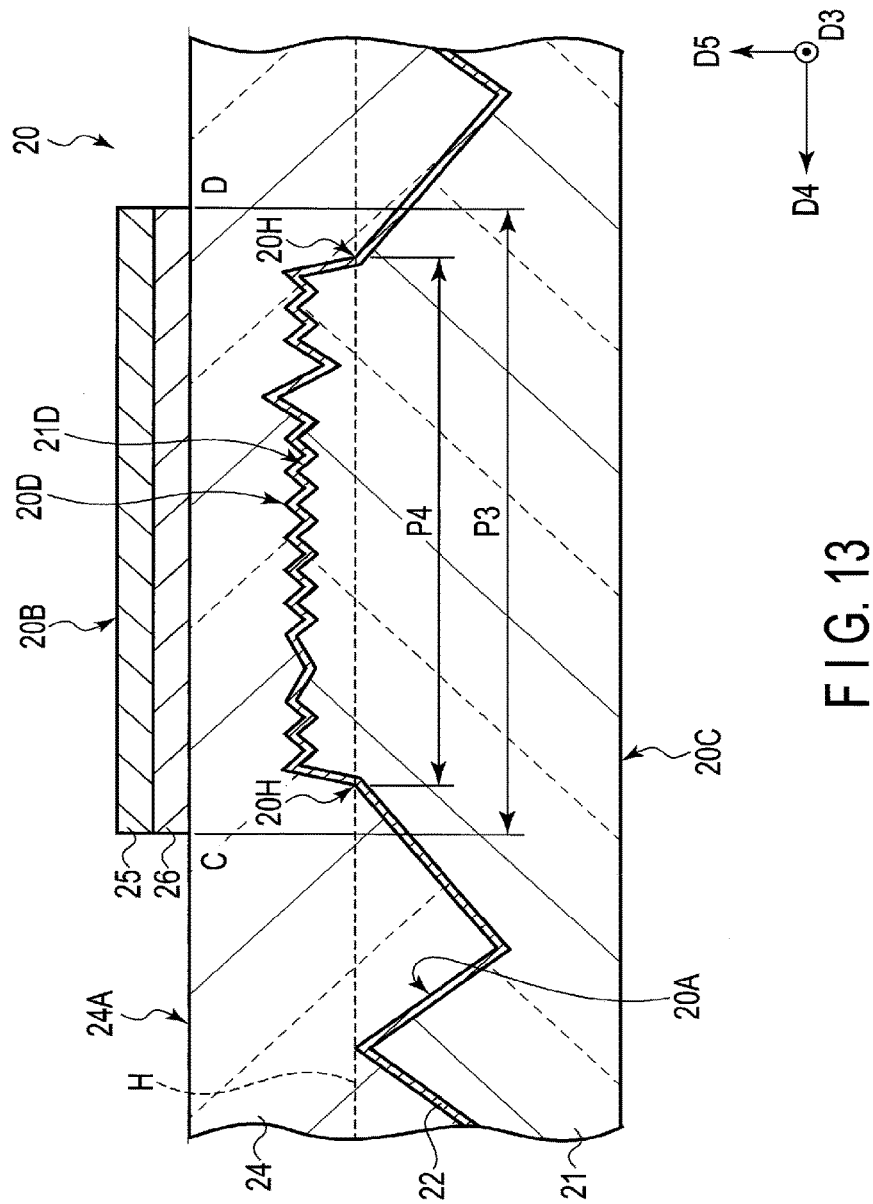
FIG. 13 is a cross-sectional view showing a modified example of the structure of the reflective element 20 shown in FIG. 9.

FIG. 13 is a cross-sectional view showing a modified example of the structure of the reflective element 20 shown in FIG. 9.

The present modified example is different from the configuration example shown in FIG. 9 with respect to a feature that the specular reflection surface 20B is located above the horizontal plane H.

In the example illustrated, the reflective element 20 has an irregular uneven surface 20D sandwiched between the retroreflective surfaces 20A. The base 21 has an irregular uneven surface 21D in a region sandwiched between the top parts 20H, and the metallic thin film 22 is also uniformly disposed on the uneven surface 21D and the uneven surface 20D is formed. In the example illustrated, the uneven surface 20D is located above the horizontal plane H (remotely from the back surface 20C) but is not particularly limited, and the uneven surface 20D may be located under the horizontal plane H (closely to the back surface 20C).

The reflective element 20 further comprises an overcoat layer 24 and a reflective layer 25. The overcoat layer 24 is located above the base 21. In the example illustrated, the overcoat layer 24 covers the metallic thin film 22. For this reason, the display device 1 can suppress damage of the metallic thin film 22 and suppress degradation in retroreflectance caused by irregular reflection at the damaged part.

In the example illustrated, the overcoat layer 24 is in contact with an air layer on a side (upper surface 24A) opposite to the side opposed to the base 21, in a region opposed to the retroreflective surface 20A. The overcoat layer 24 is not particularly limited if the overcoat layer 24 has transparency, but its refractive index is desirably close to 1 from the viewpoint of suppressing the occurrence of ghost caused by the reflection on the upper surface 24A. In addition, the upper surface 24A is desirably even from the viewpoint of suppressing the occurrence of ghost caused by the irregular reflection on the upper surface 24A. The overcoat layer 24 is formed by, for example, a wet process using a transparent resin material.

The reflective layer 25 is located above the overcoat layer 24. The reflective layer 25 has the specular reflection surface 20B on a side opposite to the side opposed to the base 21. For example, the reflective layer 25 is formed of a metal having a light-reflecting property, for example, the same material as the material of the metallic thin film 22. In the example illustrated, the reflective layer 25 is bonded to the overcoat layer 24 via an insulating interlayer film 26, but may be formed directly on the overcoat layer 24 by, for example, vapor deposition.

The pitch P3 of the specular reflection surfaces 20B corresponds to a width of the reflective layer 25 in the fourth direction D4. The pitch P4 corresponds to the width of the uneven surface 20D in the fourth direction D4. In the example illustrated, the pitch P3 is larger than the pitch P4. The reflective layer 25 is opposed to the entire body of the uneven surface 20D, and extends to the outside of a region opposed to the uneven surface 20D so as to be opposed to several parts of the retroreflective surface 20A. The display light made incident obliquely on the overcoat layer 24 and irregularly reflected on the uneven surface 20D can be thereby suppressed.

According to the present modified example, the specular reflection surface 20B can be formed without flattening the uneven surface 21D in a polishing process or the like. For this reason, generation of foreign matters such as dust and the like in the manufacturing process can be suppressed.

In the reflective element 20, the metallic thin film 22 may not be disposed but the overcoat layer 24 may be disposed directly on the base 21. In this case, the retroreflective surface 20A corresponds to an interface between the base 21 and the overcoat layer 24. In this configuration, the refractive index of the overcoat layer 24 is desirably different greatly from the refractive index of the base 21 to improve the retroreflectance of the retroreflective surface 20A.

FIG. 14 is a cross-sectional view showing a modified example of the structure of the reflective element 20 shown in FIG. 9.

The present modified example is different from the configuration example shown in FIG. 13 with respect to a feature of not comprising the overcoat layer 24. An interlayer film 26 is disposed on the uneven surface 20D.

The interlayer film 26 may be conductive and can thereby maintain the reflective layer 25 and the metallic thin film 22 at the same potential. In addition, the interlayer film 26 may have optical absorbency and can thereby suppress irregular reflection of the display light incident on a side surface 26A of the interlayer film 26.

According to the present modified example, the specular reflection surface 20B can be formed without flattening the uneven surface 21D of the base 21 and the occurrence of ghost caused by the overcoat layer 24 can be suppressed, similarly to the modified example shown in FIG. 13.

In the reflective element 20, the interlayer film 26 may be disposed on the base 21 and the metallic thin film may be uniformly formed on the base 21 and the interlayer film 26. In this configuration, the metallic thin film 22 and the reflective layer 25 are continuous and the side surface 26A is also covered with the metallic thin film 22. The display light traveling toward the side surface 26A is reflected on the metallic thin film covering the side surface 26A, made incident on the retroreflective surface 20A or 30A, reflected again on the side surface 26A and transmitted through the optical element 10 to contribute to the image formation, in this configuration. The efficiency of use of the display light can be therefore improved.

Figure 15:
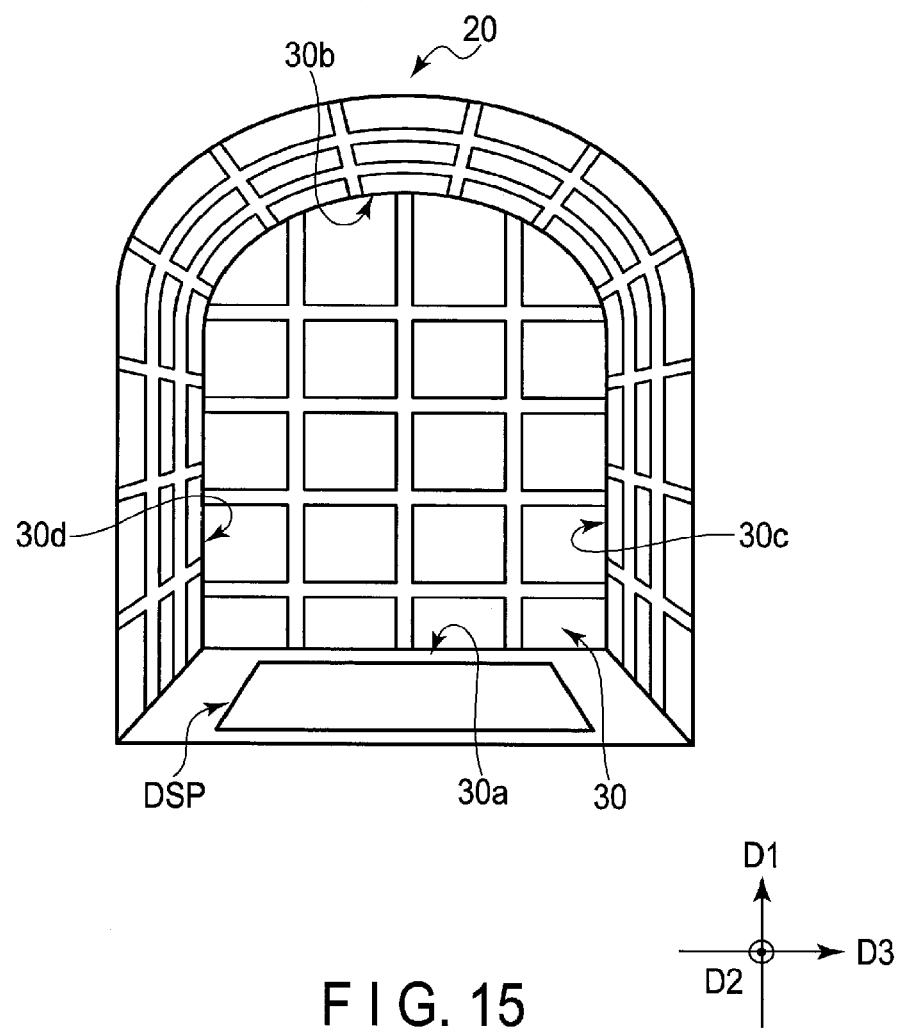
FIG. 15 is an illustration showing a modified example of the display device 1 shown in FIG. 1.

FIG. 15 is an illustration showing a modified example of the display device 1 shown in FIG. 1.

The present modified example is different from the configuration example shown in FIG. 1 with respect to a feature that the reflective element 20 is bent. The display device 1 illustrated in the figure has a configuration in which the display module DSP, and the reflective elements 20 and 30 are observed from a position of the optical element 10 in a third direction D3. However, illustration of the optical element 10 is omitted. The third direction D3 is a direction intersecting the first direction D1 and the second direction D2, and is orthogonal to the first direction D1 and the second direction D2 in the example illustrated.

The reflective element 30 comprises end portions 30a, 30b, 30c and 30d. The end portion 30b is opposed to the end portion 30a in the first direction D1, and the end portion 30d is opposed to the end portion 30c in the third direction D3.

In the example illustrated, the end portion 30b has both ends arcuately curved to the direction of the end portion 30a, and the end portions 30c and 30d are formed in a straight line extending in the first direction D1. In other words, the reflective element 30 is shaped in a horseshoe. However, the shape of the reflective element 30 is not particularly limited but may be a semicircular shape or a fan shape. The reflective element 20 is continuous along the end portions 30b to 30d, and opposed to the display module DSP in the first direction D1 and opposed to the own reflective element 20 in the third direction D3.

In the present modified example, since the reflective element 20 is disposed at the end portions 30c and 30d, too, the display light emitted toward the end portions 30c and 30d can also contribute to formation of the display image I1. In addition, since the reflective element 20 is disposed continuously from the end portion 30b along the end portion 30c and from the end portion 30b along the end portion 30d, the degradation in retroreflectance caused by the boundary of the reflective elements can be suppressed.

FIG. 16 is an illustration showing a modified example of the display device 1 shown in FIG. 1.

The present modified example is different from the modified example shown in FIG. 15 with respect to a feature that the reflective element 30 has a rectangular shape and comprises reflective elements 40 and 50.

In the example illustrated, the end portions 30a and 30b are shaped in a straight line extending in the third direction D3 and are opposed to each other in the first direction D1. In addition, the end portions 30c and 30d are shaped in a straight line extending in the first direction D1 and are opposed to each other in the third direction D3. The reflective element 20 is disposed on the end portion 30b, the reflective element 40 is disposed on the end portion 30c, and the reflective element 50 is disposed on the end portion 30d. Each of the reflective elements 40 and 50 comprises the same configuration as the reflective element 20 and has a retroreflective surface and a specular reflection surface.

According to the present modified example, the same advantages as those explained with reference to FIG. 15 can be obtained. In addition, according to the present modified example, the reflective elements 20 to 50 can be disposed inside a cubic housing with good efficiency, and the display device 1 can be miniaturized.

The boundary portion BD2 between the reflective elements 20 and 30 desirably has a specular reflection surface BD2B. The boundary portion BD3 between the reflective elements 20 and 50 desirably has a specular reflection surface BD3B. According to this configuration, even the display light made incident on the vicinities of the boundaries BD2 and BD3 of reduced retroreflectance on the reflective surfaces of each reflective element can contribute to the formation of the display image I1.

Next, a second embodiment will be explained.

Figure 17:
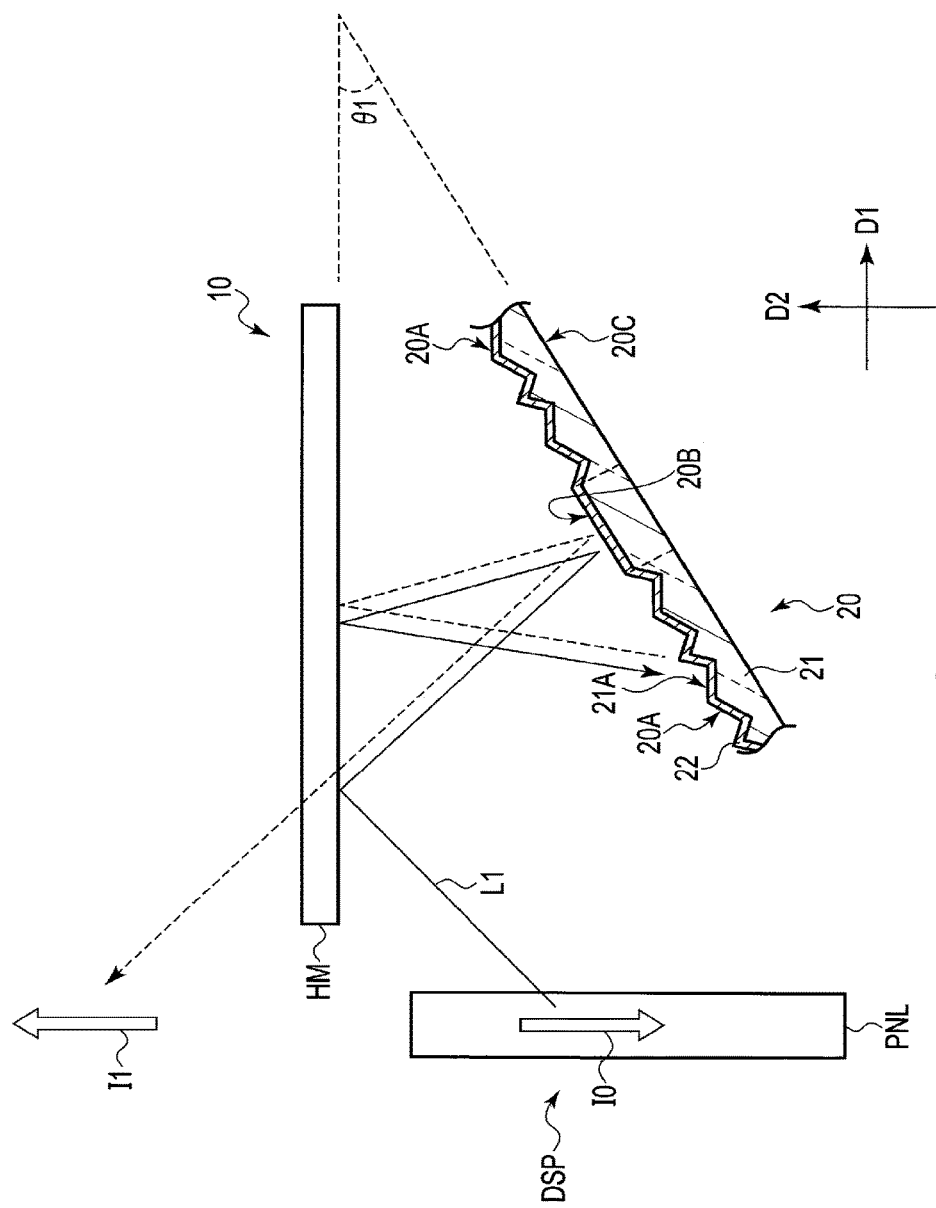
FIG. 17 is an illustration showing a configuration example of a display device 1 of a second embodiment and an optical path of display light L1.

FIG. 17 is an illustration showing a configuration example of a display device 1 of a second embodiment and an optical path of display light L1.

An optical element 10 comprises a beam splitter HM which urges part of incident light to be transmitted and reflected. An angle θ1 made between a reflective element 20 and the optical element 10 is an acute angle. The display device 1 does not comprise a reflective element 30. The other constituent elements are the same as those of the first embodiment and are not explained in detail. In the example illustrated, a display module DSP does not comprise a retardation film on a side of the display panel PNL opposed to the optical element 10 but may comprise a retardation film RB.

A beam splitter HM is, for example, a half-mirror. The reflective element 20 is opposed to the display module DSP in a first direction D1 and opposed to the optical element 10 in a second direction D2. The angle θ1 corresponds to an angle between a back surface 20C of the reflective element 20 and the surface of the beam splitter HM.

Next, an optical path of the display light L1 will be explained. The display light L1 displaying the display image I0 is emitted from the display module DSP and is made incident on the optical element 10. The display light L1 is reflected on the optical element 10 and made incident on the specular reflection surface 20B. The display light L1 reflected on the specular reflection surface 20B is then reflected on the optical element 10 and made incident on the retroreflective surface 20A. The display light L1 is retroreflected on the retroreflective surface 20A, reflected again on the optical element 10 and reflected on the specular reflection surface 20B. After that, the display light L1 is transmitted through the optical element 10 to form the display image I1.

FIG. 18 is an illustration showing an optical path of display light L2 in the display device 1 shown in FIG. 17. An optical path of the display light L2 emitted in a direction different from the display light L1 will be explained.

The display light L2 is emitted from the display module DSP and made incident on the optical element 10. The display light L2 is reflected on the optical element 10 and made incident on the retroreflective surface 20A. The display light L2 is retroreflected on the retroreflective surface 20A and transmitted through the optical element 10 to form the display image I1.

Since the display light makes the behavior as explained above, the angle θ1 is an angle at which at least part of the display light reflected on the specular reflection surface 20B is made incident on the optical element 10. Furthermore, the angle θ1 is an angle at which at least part of the display light reflected on the specular reflection surface 20B is reflected on the optical element 10 and made incident on the retroreflective surface 20A. The angle θ1 is desirably greater than 0 degrees and smaller than 90 degrees from the viewpoint of increasing the rate of the display light which contributes to the formation of the display image I1. The angle θ1 is, for example, 45 degrees or smaller.

According to the second embodiment, the same advantages as those of the first embodiment can be obtained.

Examples of the display device which can be obtained from the configurations described in the present specification are mentioned below.

(1) A display device comprising:
an optical element urging incident light to be transmitted or reflected;
a first reflective element comprising a first retroreflective surface in an uneven state on which the light reflected on the optical element is retroreflected, and a first specular reflection surface on which the light reflected on the optical element is specularly reflected; and
a second reflective element comprising a second retroreflective surface in an uneven state on which the light reflected on the first specular reflection surface is retroreflected.

(2) The display device of (1), wherein
the optical element comprises:

a polarizing element having a transparent axis which urges first linearly polarized light to be transmitted and reflecting second linearly polarized light orthogonal to the transparent axis; and a retardation film opposed to the polarizing element and assigning a phase difference to the transmitted light.

(3) The display device of (2), further comprising:

a display module emitting first display light and second display light which is first circularly polarized light,
wherein
the first display light is converted into the second linearly polarized light when transmitted through the retardation film, reflected on the polarizing element, converted into second circularly polarized light in an opposite direction to the first circularly polarized light when transmitted through the retardation film, reflected on the first specular reflection surface, reflected on the second retroreflective surface, reflected on the first specular reflection surface, converted into the first linearly polarized light when transmitted through the retardation film, and transmitted through the polarizing element, and the second display light is converted into the second linearly polarized light when transmitted through the retardation film, reflected on the polarizing element, converted into the second circularly polarized light when transmitted through the retardation film, reflected on the first retroreflective surface, converted into the first linearly polarized light when transmitted through the retardation film, and transmitted through the polarizing element.

(4) The display device of any one of (1) to (3), wherein the first retroreflective surface and the first specular reflection surface include metallic thin films.

(5) The display device of any one of (1) to (4), wherein the first specular reflection surface is formed on a plane connecting top parts of the first retroreflective surface.

(6) The display device of any one of (1) to (5), wherein the first specular reflection surfaces are disposed in a grating state.

(7) A display device comprising:

an optical element urging part of incident light to be transmitted or reflected; and a reflective element comprising a retroreflective surface in an uneven state on which the light reflected on the optical element is retroreflected, and a specular reflection surface on which the light reflected on the optical element is specularly reflected, an angle formed by the reflective element with the optical element being an acute angle.

(8) The display device of any one of (1) to (6), wherein the second reflective element further comprises a second specular reflection surface, the first specular reflection surface is in contact with the second retroreflective surface at a boundary portion at which the first reflective element and the second reflective element are in contact with each other, and the second specular reflection surface is in contact with the first retroreflective surface at the boundary portion.

(9) The display device of any one of (1) to (6) and (8), wherein the first specular reflection surface extends orthogonally or parallel to a boundary portion between the first reflective element and the second reflective element.

(10) The display device of any one of (1) to (6) and (8) or (9), wherein the first specular reflection surface extends obliquely to the boundary portion between the first reflective element and the second reflective element.

(11) The display device of any one of (1) to (6) and (8) to (10), wherein the first reflective element and the second reflective element comprise bases continuous to each other.

(12) The display device of any one of (1) to (6) and (8) to (11), wherein the first reflective element is bent.

(13) The display device of any one of (1) to (6) and (8) to (12), further comprising:

a display module emitting display light;

a third reflective element comprising a third retroreflective surface on which the incident light is retroreflected; and a fourth reflective element comprising a fourth retroreflective surface on which the incident light is retroreflected,
wherein
the display module is disposed at a first end portion of the second reflective element, the first reflective element is disposed at a second end portion opposed to the first end portion of the second reflective element, the third reflective element is disposed at a third end portion extending in a direction intersecting the first end portion of the second reflective element, and the fourth reflective element is disposed at a fourth end portion opposed to the third end portion of the second reflective element.

(14) The display device of any one of (1) to (6) and (8) to (13), wherein the first reflective element is disposed at an angle greater than or equal to 45 degrees and smaller than or equal to 135 degrees with respect to the second reflective element.

(15) The display device of any one of (1) to (6) and (8) to (14), wherein the first reflective element is disposed at an angle greater than or equal to 45 degrees and smaller than or equal to 135 degrees with respect to the optical element.

(16) The display device of (7), further comprising:

a display module emitting first display light and second display light,
wherein
the first display light is reflected on the optical element, reflected on the specular reflection surface, reflected on the optical element, reflected on the retroreflective surface, reflected on the optical element, reflected on the specular reflection surface, and transmitted through the optical element, and the second display light is reflected on the optical element, reflected on the retroreflective surface and transmitted through the optical element.

(17) The display device of (7) or (16), wherein the retroreflective surface and the specular reflection surface include metallic thin films.

(18) The display device of any one of (7), (16) and (17), wherein the specular reflection surface is disposed on a plane connecting top parts of the retroreflective surface.

(19) The display device of (7) or any one of (16) to (18), wherein the specular reflection surfaces are disposed in a grating state on the reflective element.

(20) The display device of (7) or any one of (16) to (19), wherein the reflective element is opposed to the optical element in a first direction and opposed to the display module in a second direction intersecting the first direction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    an optical element which transmits or reflects incident light emitted from a light source:
    a first reflective element comprising a first retroreflective surface on which the light reflected on the optical element is retroreflected, and a first specular reflection surface on which the light reflected on the optical element is specularly reflected;
    a second reflective element comprising a second retroreflective surface on which the light reflected on the first specular reflection surface is retroreflected; and
    a display module emitting first display light which is first circularly polarized light and second display light which is the first circularly polarized light,
    wherein
    the optical element comprises:
    a polarizing element comprising a transparent axis which transmits first linearly polarized light and reflects second linearly polarized light orthogonal to the transparent axis; and
    a retardation film opposed to a surface of the polarizing element which is opposed to the light source and the first reflective element, and changing transmitted light by a phase difference,
    the first display light is converted into the second linearly polarized light when transmitted through the retardation film, reflected on the polarizing element, converted into second circularly polarized light in an opposite direction to the first circularly polarized light when transmitted through the retardation film, reflected on the first specular reflection surface, reflected on the second retroreflective surface, reflected on the first specular reflection surface, converted into the first linearly polarized light when transmitted through the retardation film, and transmitted through the polarizing element, and
    the second display light is converted into the second linearly polarized light when transmitted through the retardation film, reflected on the polarizing element, converted into the second circularly polarized light when transmitted through the retardation film, reflected on the first retroreflective surface, converted into the first linearly polarized light when transmitted through the retardation film, and transmitted through the polarizing element.

2. The display device of claim 1, wherein the first retroreflective surface and the first specular reflection surface include metallic thin films.

3. The display device of claim 1, wherein the first specular reflection surface is arranged on a plane connecting top parts of the first retroreflective surface.

4. The display device of claim 1, wherein the first specular reflection surface is arranged in a grating state.

5. The display device of claim 4, wherein the first retroreflective surface is surrounded by the first specular reflection surface.

6. The display device of claim 5, wherein a width of the first specular reflection surface in a first direction is smaller than a width of the first retroreflective surface in the first direction.

7. The display device of claim 5, wherein the second reflective element is in contact with the first reflective element at a boundary portion.

8. The display device of claim 7, wherein the second reflective element has a second specular reflection surface on which the light reflected on the first specular reflection surface is specularly reflected.

9. The display device of claim 8, wherein the second specular reflection surface is arranged in a grating state.

10. The display device of claim 9, wherein the second retroreflective surface is surrounded by the second specular reflection surface.

11. The display device of claim 10, wherein the first retroreflective surface is in contact with the second retroreflective surface at the boundary portion, and the first specular reflection surface is in contact with the second specular reflection surface at the boundary portion.

12. The display device of claim 11, wherein the first specular reflection surface extends orthogonally or parallel to the second specular reflection surface.

13. The display device of claim 10, wherein the first retroreflective surface is in contact with the second specular reflection surface at the boundary portion, and the first specular reflection surface is in contact with the second retroreflective surface at the boundary portion.

* * * * *